(12) United States Patent
Boote (10) Patent No.: US 8,405,901 B2
(45) Date of Patent: Mar. 26, 2013

(54) SWITCHABLE GLAZINGS (75) Inventor: Joseph Jeremy Boote, Ormskirk (GB)

(73) Assignee: Pilkington Group Limited, Merseyside (GB)

( * ) Notice: Subject to any disclaimer, the term of this patent is extended or adjusted under 35 U.S.C. 154(b) by 73 days.

(21) Appl. No.: 13/120,313

(22) PCT Filed: Sep. 22, 2009

(86) PCT No.: PCT/GB2009/051234
§ 371 (c)(1),
(2), (4) Date: Mar. 22, 2011

(87) PCT Pub. No.: WO2010/032070
PCT Pub. Date: Mar. 25, 2010

(65) Prior Publication Data
US 2011/0170170 A1 Jul. 14, 2011

(30) Foreign Application Priority Data

Sep. 22, 2008 (GB) .................................. 0817298.3
Sep. 22, 2008 (GB) .................................. 0817300.7

(51) Int. Cl.
G02F 1/29 (2006.01)
G02B 26/00 (2006.01)

(52) U.S. Cl. ........................................ 359/320; 359/296

(58) Field of Classification Search .................... 349/16, 349/96; 359/240, 275, 296, 320, 321
See application file for complete search history.

(56) References Cited

U.S. PATENT DOCUMENTS

| 5,111,329 A | 5/1992 | Gajewski et al. |
|---|---|---|
| 5,408,353 A | 4/1995 | Nichols et al. |
| 5,650,872 A | 7/1997 | Saxe et al. |
| 5,889,608 A | 3/1999 | Buffat et al. |
| 6,373,618 B1 | 4/2002 | Agrawal et al. |
| 2004/0257649 A1 | 12/2004 | Heikkila et al. |
| 2005/0195488 A1 | 9/2005 | McCabe et al. |
| 2011/0171443 A1* | 7/2011 | Thompson .................... 428/212 |
| 2012/0176656 A1* | 7/2012 | Boote et al. .................... 359/240 |

FOREIGN PATENT DOCUMENTS

| DE | 100 43 141 A1 | 3/2002 |
|---|---|---|
| EP | 1653275 | 5/2006 |
| EP | 1653276 | 5/2006 |
| WO | WO 02/08826 A | 1/2002 |

(Continued)

OTHER PUBLICATIONS

International Preliminary Report on Patentability for PCT/GB2009/051234 (Mar. 2, 2011).*
International Search Report (PCT/ISA/210) issued on Jan. 15, 2010, by British Patent Office as the International Searching Authority for International Application No. PCT/GB2009/051234.

(Continued)

Primary Examiner — David N Spector
(74) Attorney, Agent, or Firm — Buchanan Ingersoll & Rooney PC (57) ABSTRACT A switchable film assembly having remote electrical connections comprises an active layer between first and second electrically conductive layers. The active layer has an optical transmission which changes upon projecting an electric field therethrough. An electrical connection connects the film to a power supply and can comprise a remote electrical connector region provided remote to the first and second electrically conductive layers, such upon connecting the film assembly to the power supply, an electrical field may be projected through at least a portion of the switchable film assembly thereby changing the optical transmission of the active layer.

18 Claims, 6 Drawing Sheets

FOREIGN PATENT DOCUMENTS

| | | |
|---|---|---|
| WO | WO 03/054823 A | 7/2003 |
| WO | WO 2005/102688 | 11/2005 |
| WO | WO 2005/102688 A2 | 11/2005 |
| WO | WO 2007/122428 | 11/2007 |
| WO | WO 2007/122429 | 11/2007 |

OTHER PUBLICATIONS

Search Report issued by the United Kingdom Intellectual Property Office on Jan. 29, 2009 in corresponding Great Britain Patent Application No. 0817298.

* cited by examiner

SWITCHABLE GLAZINGS

The present invention relates to switchable films and glazings containing such films, in particular, to the connection of such films to external power supplies.

In recent years, glazings having some form of additional functionality have become increasingly popular and sought-after. Typically, additional functionality is provided by using at least one ply of coated or tinted glass within a laminated glazing structure, to provide heat or UV-reflective properties. However, additional functionality can also be provided by including a functional device or film within a laminated glazing structure. Such devices or films may include lighting devices, such as LEDs (light emitting diodes), or switchable films, having an active layer whose optical transmittance can be altered, such as, LCDs (liquid crystal devices), or SPDs (suspended particle devices).

An SPD film, such as that described in WO2005/102688 and available under licence from Research Frontiers is a film comprising a plurality of particles suspended within a liquid suspension medium, which are held within a polymer medium. The film is switchable between a dark state (when no is voltage applied), and a highly transparent state (when voltage is applied). The degree of relative alignment between the particles is determined by the applied AC voltage, such that an SPD-based device exhibits a variable optical transmission when a variable voltage is applied.

Figure 1A:
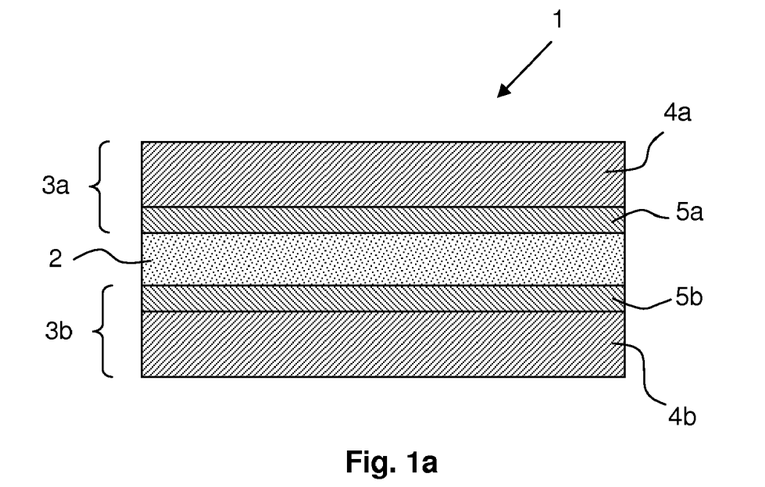
FIG. 1a, referred to above, is a schematic drawing showing the construction of a conventional SPD film.

The construction of a conventional SPD film is shown in FIG. 1a. FIG. 1a is a schematic cross-sectional view of a conventional SPD film assembly. The SPD film 1 has a laminated structure comprising an active layer of a suspended particle emulsion 2 arranged to lie between a first planar electrode 3a and a second planar electrode 3b. The optical transmission of the active layer 2 changes with an applied voltage. There may be an overcoat layer on one or both major surfaces of the active layer. Each planar electrode comprises a ply of a plastics substrate material 4a, 4b, generally a ply of polyethylene terephthalate (PET), having an electrically conductive coating 5a, 5b, generally an indium tin oxide coating (ITO) disposed on at least a portion of one surface thereof. The electrically conductive coatings 5a, 5b enable a direct electrical contact between the suspended particle emulsion 2 and an external power supply (not shown) to be provided via suitable electrical connectors.

Other SPD film constructions are known. In U.S. Pat. No. 5,650,872 a light valve is disclosed in which protective layers are placed on either side of an SPD film, in contact with the SPD film, and electrodes are placed on the outer surfaces of the protective layers. The outer electrodes are not in contact with the SPD film The electrode and protective layers may be in the form of a prefabricated assembly, such as a plastic film that has been coated with the electrode, for example a thin layer of ITO.

DE 100 43 141 discloses a glazing for use as a rooflight, which incorporates an SPD layer. Two plies of glass are formed into a double glazing structure having a partial vacuum in the gap between the plies, with an SPD layer deposited on the inner side of the lower glass ply. The SPD is switchable between a dark state and a light state.

It is preferable to be able to include a functional device, such as an SPD film within a laminated glazing structure, as the whole, or part of, the interlayer, as described in, for example, US2004/0257649, rather than using a partially evacuated double glazing structure. The interlayer used in typical laminated glazing constructions is a PVB (poly vinyl butyral) interlayer. In order to protect the SPD film within the interlayer, it is preferable that the edges of the film do not reach the edges of the glass. It is known to use a "picture frame" design, where three interlayers, rather than the usual one, are used to laminate a functional film within a glazing. A central layer, approximately the same thickness of the functional film, is cut such that the film can be placed within an interlayer frame. The film and interlayer frame are then placed between two further interlayers, and laminated between two plies of glass.

Figure 1B:
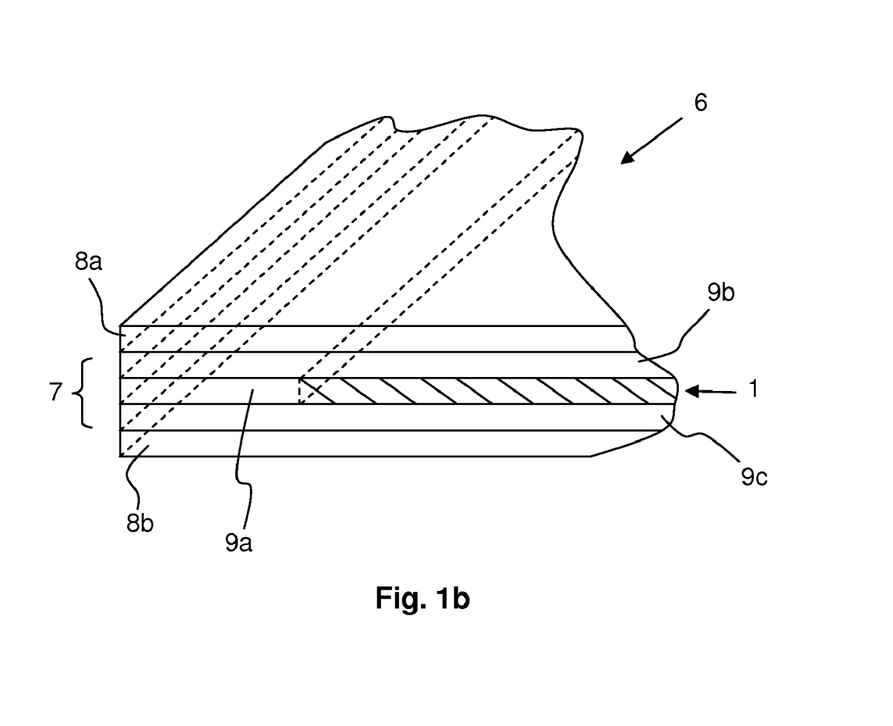
FIG. 1b, referred to above, is a schematic drawing showing the construction of a glazing having an SPD film assembly laminated therein.

FIG. 1b is a schematic drawing showing the construction of a glazing having an SPD film assembly of the type shown in FIG. 1a laminated therein. The glazing 6 has an SPD film assembly 1 laminated within an interlayer structure 7, which is itself laminated between two plies of glass 8a, 8b. The laminated structure 7 comprises three layers of interlayer material, 9a, 9b, 9c. The first interlayer 9a has a region cut of the centre in which the SPD film assembly sits, such that the first interlayer 9a forms the "picture frame". Preferably the thickness of the SPD film assembly 1 is of the same order as the first interlayer 9a. The first interlayer 9a is laminated between second 9b and third 9c interlayers, which are co-extensive with the plies of glass 8a, 8b.

Figure 2:
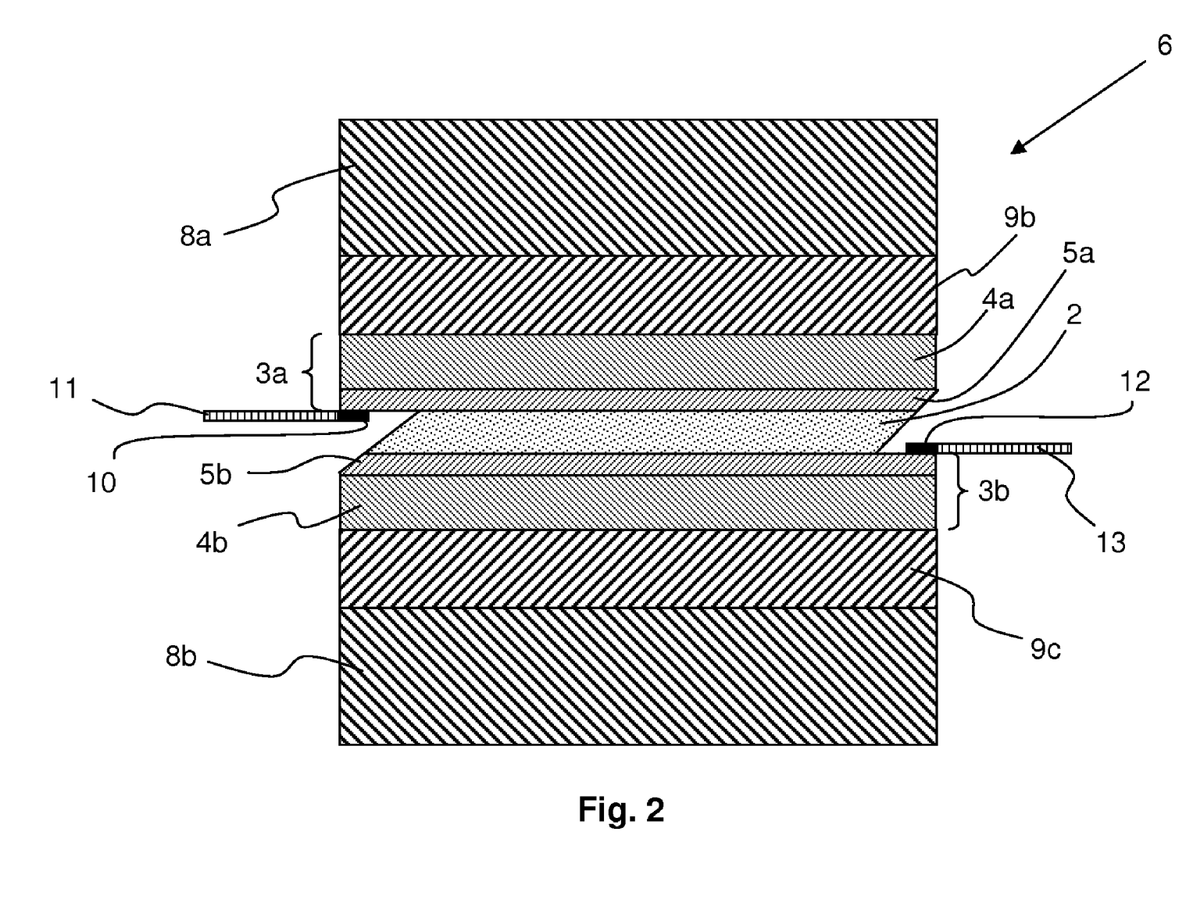
FIG. 2, referred to above, is a schematic cross-section showing a laminated glazing comprising an SPD film with busbars attached.

In order to connect the SPD film assembly 1 to a power supply, busbars are provided. FIG. 2 is a schematic cross-section showing an SPD film assembly 2 with busbars attached. As before, the SPD film assembly is as shown in FIG. 1a and comprises a first (upper) planar electrode layer 3a and a second (lower) planar electrode layer 3b having a layer of suspended particle emulsion 2 laminated therebetween. Each electrode 3a, 3b comprises a polyethylene terephthalate substrate 4a, 4b each having a thin layer of electrically conductive indium tin oxide (ITO) disposed on one surface 5a, 5b. To form an electrical connection to the first (upper) planar electrode layer 3a, an area of the second (lower) planar electrode layer 3b and the suspended particle laminate 2 are removed by cutting/scraping and or dissolution, exposing the ITO layer 5a. A region of electrically conductive silver tape 10 is adhered to the ITO layer 5a, to which a bus bar 11 comprising a tinned copper strip is soldered. To form an electrical connection to the second (lower) planar electrode layer 3b a region of the first (upper) planar electrode layer 3a and the suspended particle emulsion 2 are removed, and a region of electrically conductive silver tape 12 adhered to the ITO layer 5b. A further tinned copper strip busbar 13 is soldered to this region of electrically conductive silver tape 12.

Such methods are also used with other switchable films, such as LCD (liquid crystal device) incorporated into laminated glazings.

Unfortunately, there are several drawbacks to using such a method to provide busbars to a switchable film:

The method is both time-consuming and complicated;
Film damage may occur during the cutting operation, introducing short circuits or problems with delamination, reducing the yield of the final product;
The electrically conductive ITO layer may be damaged;
The regions where the busbars are applied are more susceptible to delamination, making edge sealing difficult; and
As the ITO layers of the opposing electrodes are separated only by the suspended particle emulsion, it is possible to introduce short circuits if the layers come into contact after processing or laminating.

Similar problems also exist with other switchable films, such as liquid crystal films, where busbars are applied using the same technique. It is therefore desirable to be able to provide electrical connectivity to a switchable film using a method that does not suffer from any of the above disadvantages.

The present invention aims to address these problems by providing a switchable film assembly comprising an active layer, between first and second electrically conductive layers, the active layer having an optical transmission that is changeable upon projecting an electric field through the active layer, the film assembly having electrical connection means to connect the film assembly to a power supply, wherein at least one of the electrical connection means comprises a first remote electrical connector region provided remote to the first and second electrically conductive layers, such that upon connecting the film assembly to the power supply, an electrical field may be projected through at least a portion of the switchable film assembly thereby changing the optical transmission of the active layer.

By using an electrical connection remote from the electrically conductive layers the above problems are at least partially overcome.

The optical transmission of the active layer may be changed by changing the absorption or scattering properties of the active layer.

Preferably, the first electrically conductive layer is supported on a first plastic substrate, and the first remote electrical connector region is provided on the first plastic substrate.

Preferably the second electrically conductive layer is supported on a second plastic substrate, and there is a second remote electrical connector region provided on the second plastic substrate.

Preferably, the active layer is a layer of a suspended particle emulsion.

The invention also provides a glazing pane comprising a first ply of a glazing material, preferably glass, and the switchable film assembly, wherein the switchable film assembly faces the first ply of glazing material.

Preferably the glazing pane further comprises at least one other ply of glazing material, preferably glass, wherein there is an air gap between the first and the at least one other ply of glazing material. Such an embodiment is usually known as an insulating glazing unit, and example being a double glazed unit.

Preferably the glazing pane further comprising a second ply of glazing material, preferably glass, wherein the switchable film assembly is laminated between the first and second plies of the glazing material by means of at least first and second layers of adhesive interlayer material, preferably PVB or EVA.

Preferably the first ply of glazing material comprises an electrically conductive coating disposed on at least a portion of a surface thereof, and wherein the first remote electrical connector region is provided on the electrically conductive coating of the first ply of glazing or on a non-coated surface of the first ply of glazing material and wherein the second ply of glazing material comprises an electrically conductive coating disposed on at least a portion of a surface thereof, and wherein the at least one other remote electrical connector region is provided on the electrically conductive coating of the second ply of glazing material or on a non-coated surface of the second ply of glazing material.

In a preferred embodiment, the glazing is a laminated glazing comprising one other remote electrical connection. In this situation, preferably the first and second planar electrode layers comprise a plastics substrate material having an electrically conductive coating disposed on at least a portion of one surface thereof, and wherein the one other remote electrical connector region is provided on the plastics substrate material. Alternatively, the first and second planar electrode layers may comprise a plastics substrate material having an electrically conductive coating disposed on at least a portion of one surface thereof, and wherein the one other remote electrical connector region is provided on the electrically conductive coating. The laminated glazing further may comprise at least one layer of an interlayer material having an electrically conductive coating disposed on at least a portion of one surface thereof, and wherein the one other remote electrical connector region is provided on a non-coated surface of the layer of interlayer material. The laminated glazing may further comprise at least one layer of an interlayer material having an electrically conductive coating disposed on at least a portion of one surface thereof, and wherein the one other remote electrical connector region is provided on the electrically conductive coating.

In other embodiments, preferably the glazing pane further comprises at least one layer of an interlayer material having an electrically conductive coating disposed on at least a portion of one surface thereof, and wherein the first remote electrical connector region is provided on a non-coated surface of the layer of interlayer material.

Alternatively, the glazing pane may further comprise at least one layer of an interlayer material having an electrically conductive coating disposed on at least a portion of one surface thereof, and wherein the first remote electrical connector region is provided on the electrically conductive coating.

Preferably the first ply of glazing material comprises an electrically conductive coating disposed on at least a portion of a surface thereof, and wherein the first remote electrical connector region is provided on the electrically conductive coating of the first ply of glazing or on a non-coated surface of the first ply of glazing material.

When there are two plies of glass, at least one of the first and second plies of glass may comprise an electrically conductive coating disposed on at least a portion of a surface thereof, and wherein the first remote electrical connector region is provided on the electrically conductive coating.

In a preferred embodiment, the glazing pane comprises at least one other remote electrical connector region, remote to the first and second electrically conductive layers. Preferably the glazing pane further comprises at least one layer of an interlayer material having an electrically conductive coating disposed on at least a portion of one surface thereof, and wherein the at least one other remote electrical connector region is provided on a non-coated surface of the interlayer material or on the electrically conductive coating of the interlayer material.

In other embodiments, preferably the first remote electrical connector region is also in electrical communication with a heater array or film, an antenna or other electrical device.

Preferably the first remote electrical connector region comprises a busbar, preferably a tinned copper strip, or an electrically conductive coating.

Preferably the glazing pane is for use as a window in an air, land or sea vehicle, or for use as an interior window or exterior window of a building.

From a second aspect, the present invention also provides a method of manufacturing a switchable film assembly having a remote electrical connector region, the method comprising providing a switchable film comprising first and second planar electrode layers, each having a plastic substrate material having a first electrically conductive coating disposed on at least a portion of one surface thereof and having an active portion laminated therebetween, each electrically conductive coating being in contact with a surface of the active portion;

and depositing a second electrically conductive coating on an uncoated surface of the substrate of at least one of the planar electrode layers, thereby producing the remote electrical connector region.

Preferably the method comprises the step of making an electrical connection between the second electrically conductive coating and an electrical connection means to connect the switchable film assembly to a power supply.

From a third aspect, the present invention also provides a switchable film assembly comprising an active layer, the optical transmission of which changes with an applied voltage, laminated between first and second planar electrode layers, the planar electrode layers comprising a plastics substrate material having an electrically conductive coating disposed on at least a portion of one surface thereof, wherein the first electrically conductive coating is in between the active layer and the first plastic substrate and the second plastic substrate is in between the active layer and the second electrically conductive coating, such that the switchable film assembly has an electrically insulating region on the uncoated surface of the first planar electrode where a remote electrical connector region, remote from the first and second electrically conductive coatings may be positioned.

A switchable film assembly in accordance with the third aspect of the present invention may be provided with a remote electrical connector region, such as an electrically conductive coating or busbar or the like, on the uncoated surface of the first planar electrode layer.

The present invention also provides a method a manufacturing a film in accordance to the third aspect of the invention, the method comprising providing a first planar electrode comprising a ply of plastics material having an electrically conductive coating disposed on at least a portion of one surface thereof; applying a layer of a suspended particle emulsion to the electrically conductive coating on first planar electrode, forming an active layer; laying a second planar electrode comprising a ply of plastics material having an electrically conductive coating disposed on at least a portion of one surface thereof on to the active layer, with the ply of plastics material in contact with the active layer; and laminating the first planar electrode, the active layer and the second planar electrode to form the switchable film assembly.

The active layer may comprise an overcoat layer on one surface thereof, in between the first planar electrode and the active layer. The active layer may comprise another overcoat layer in between the second planar electrode and the active layer.

The present invention will now be described by way of example only, and with reference to the accompanying drawings in which.

In order to overcome the problems of forming physical, galvanic connections between busbars and an electrically conductive layer in a switchable film in a laminated glazing, the present invention utilises remote electrical connections. A remote electrical connection is one that is not in direct electrical contact (sometimes known as galvanic or ohmic contact) with the electrode layers that provide the required electric field to switch the film, when the electrodes are in electrical communication with an external power supply. Consequently, a remote electrical connection is also remote to the active layer. The remote electrical connector enables an electric field to be projected through the active layer, driving the switching process. Such remote electrical connections may be capacitive in nature, as discussed in more detail below.

Although in each of the examples given, an SPD film is used as the switchable film, the invention is equally applicable to other switchable films incorporated into glazings or other laminated structures, where the optical transmission of an active layer changes when a voltage is applied. Such films include LCD films, other layered electronic devices, such as OLEDs (organic light emitting diodes) or electrochromic materials included in laminated glazings.

Figure 3:
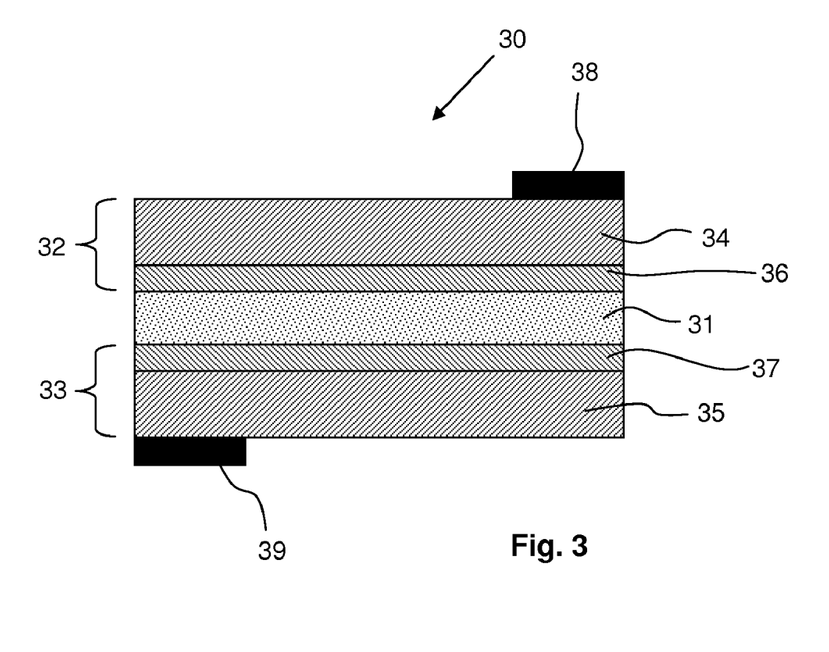
FIG. 3 is a schematic cross-section showing an SPD film assembly having remote electrical connections in accordance with a first embodiment of the present invention.

FIG. 3 is a schematic cross-section showing an SPD film assembly having remote electrical connections in accordance with a first embodiment of the present invention. The SPD film assembly 30 comprises an active layer 31, (containing the suspended particle emulsion), laminated between first 32 and second 33 planar electrode layers. Each planar electrode layer 32, 33 comprises a PET substrate 34, 35 having an electrically conductive ITO coating 36, 37 disposed thereon. The film assembly is structured such that each ITO coating 36, 37 is in contact with the active layer 31. A first remote electrical connector region 38 is positioned on the surface of the PET substrate 34 of the first planar electrode layer 32 away from the ITO coating 36, such that it is contactable with a first layer of interlayer material (not shown) when the film assembly is 30 included in a laminated glazing. A second remote electrical connector region 39 is positioned on the surface of the PET substrate 35 of the second planar electrode layer 33 away from the ITO coating 37, such that it is contactable with a second layer of interlayer material (not shown) in the final laminated glazing. The first and second remote electrical connector regions 38, 39 are busbars formed from tinned copper strips, attached to the surface of the PET substrates 34, 35 by means of electrically conductive silver paint and electrically conductive tape. Where such remote electrical connector regions are opaque such that they would be visible when the glazing containing the switchable film is fitted into a glazing, for example in a vehicle or a building, they may be hidden from view behind a printed region, such as an obscuration band (a printed region around the periphery of the glazing formed from black ceramic ink).

The remote electrical connector regions 38, 39 are positioned to couple to the electrically conductive ITO coatings 36, 37 of the planar electrode layers 32, 33. Upon connecting the remote electrical connector regions 38, 39 to a suitable power supplier, an electric field is projected through the active layer 31, thereby changing the optical transmission thereof. The electric potential is projected perpendicularly through the active layer 31, by the electrically conductive ITO layers 36, 37. Each is electrical connector region 38, 39 is remote from the active layer 31 it provides an electrical supply to. In this example both remote electrical connector regions do not provide a direct galvanic contact to the ITO coatings. Consequently, the remote electrical connector regions and the planar electrode layers couple energy via a capacitive connection.

Figure 4:
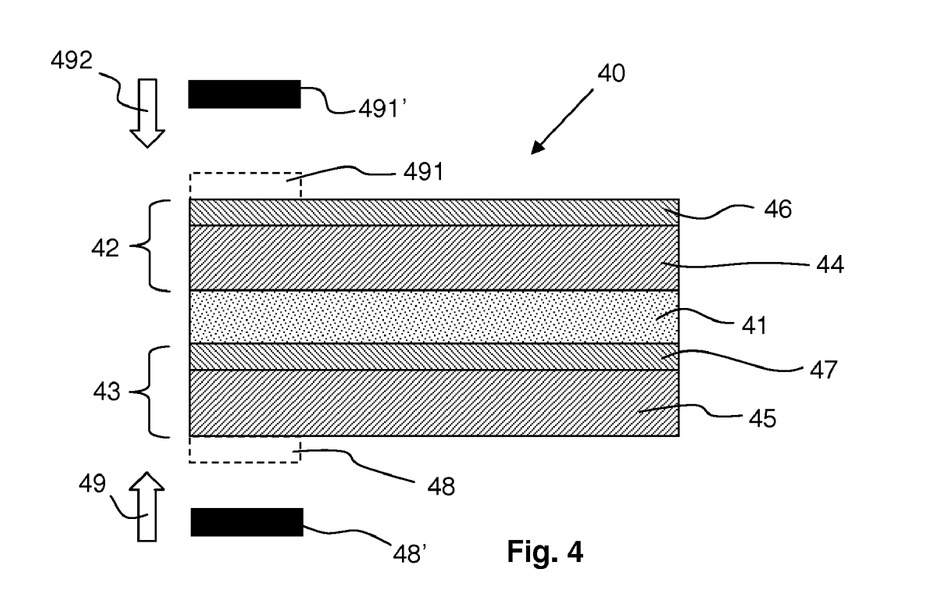
FIG. 4 is a schematic cross-section showing an SPD film assembly having remote electrical connections in accordance with a second embodiment of the present invention.

FIG. 4 is a schematic cross-section showing an SPD film that may have a remote electrical connector region connected thereto in accordance with the first aspect of the present invention.

The SPD film 40 comprises an active layer 41, (containing the suspended particle emulsion), laminated between first 42 and second 43 planar electrode layers. Each planar electrode layer 42, 43 comprises a PET substrate 44, 45 having an electrically conductive ITO coating 46, 47 disposed thereon. In this embodiment, the orientation of the first planar electrode layer 42 is reversed compared to a conventional SPD film as shown in FIG. 1a, such that the PET substrate 44 contacts the active layer 41, and the ITO coating 46 is exposed. Thus the ITO coating 46 is contactable with a layer of an adhesive interlayer material, such as polyvinyl butyral (not shown) when the film is included in a laminated glazing. The ITO coating 47 of the second planar electrode layer 43 remains in contact with the active layer 41.

A first remote electrical connector region may be positioned on the surface of the PET substrate 45 of the second planar electrode layer 43 away from the ITO coating 47. The electrical connector 48' may be moved in the direction of arrow 49 and suitably adhered to the surface of the PET substrate 45. The remote electrical connector region 48 is shown in phantom on the surface of the PET substrate 45. The remote electrical connector region 48 may be a busbar or an electrically conductive coating.

A direct galvanic connection may be made with the ITO coating 46. An electrical connector 491' may be moved in the direction of arrow 492 until contact with the ITO coating 46 is made (as shown in phantom). The direct galvanic connector 491 may be suitably adhered to the ITO coating 46, thereby providing a direct galvanic connector region. The direct galvanic connector 491 may be a busbar or an electrically conductive coating.

The SPD film may be brought into electrical communication with a suitable power supply via the regions 48, 50. An electric field will be projected through the active layer 41, thereby changing the optical transmission thereof.

It will be readily apparent to one skilled in the art that the SPD film 40 may be provided with a direct galvanic connection to the ITO coating 47, instead of a remote electrical connector region. A direct galvanic electrical connection may be made by removing part of the PET substrate 45 to expose the ITO coating 47. Alternatively, the ITO coating 47 may be exposed by removing part of the first electrode 42 and active layer 41.

Figure 5:
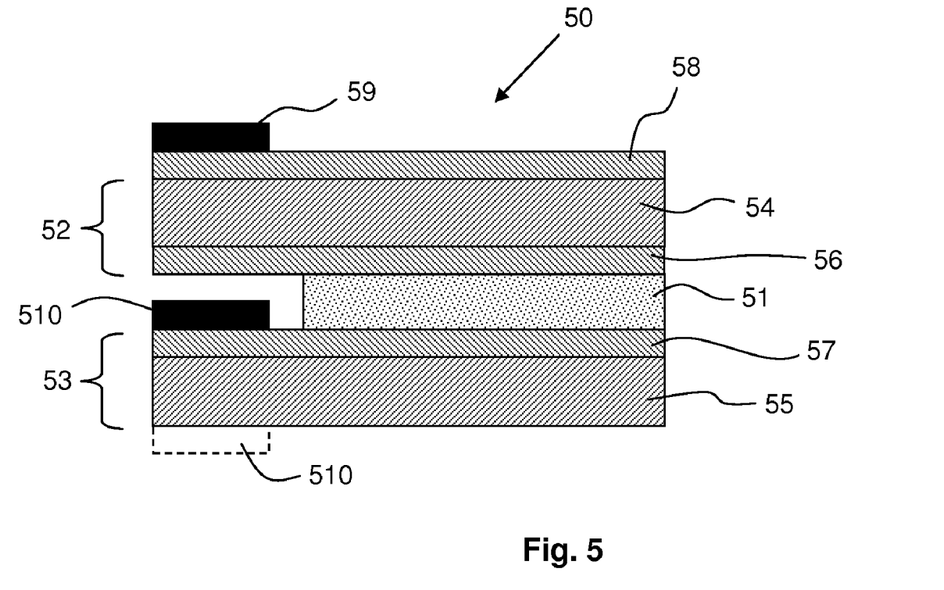
FIG. 5 is a schematic cross-section of an SPD film assembly having remote electrical connections in accordance with a third embodiment of the present invention.

FIG. 5 is a schematic cross-section of another SPD film assembly having at least one remote electrical connection. The SPD film assembly 50 comprises an active layer 51, (containing the suspended particle emulsion), laminated between first 52 and second 53 planar electrode layers. Each planar electrode layer 52, 53 comprises a PET substrate 54, 55 having an electrically conductive ITO coating 56, 57 disposed thereon. The film assembly is structured such that each ITO coating 56, 57 is in contact with the active layer 51. The first planar electrode layer 52 is also provided with an additional electrically conductive coating 58 on the opposite surface to the ITO coating 56 that is in contact with the active layer 51. This additional electrically conductive coating 58 covers at least a portion of the surface of the PET substrate 54. A first remote electrical connector region 59 is positioned on this additional electrically conductive coating. A direct galvanic electrical connector region 510 is positioned on the ITO coating 57 of the second planar electrode layer 53. In order to accommodate the electrical connector region 510, a portion of the active layer 51 is removed, exposing the ITO coating 57.

In an alternative embodiment, instead of the electrical connector region 510, there may be provided a second remote electrical connector region on the surface of the second planar electrode layer 53 away from the ITO coating 57. This second remote electrical connector region 511 is shown in phantom on the surface of the PET substrate 55.

The first and second remote electrical connector regions 59, 511 may be formed from tinned copper strips and may be attached to the relevant surface by means of electrically conductive silver paint and electrically conductive tape.

The remote electrical connector region 59 is positioned to provide an electric field that is projected through the PET substrate 54 and through the active layer 51. The remote electrical connector region is remote from the active layer 51. Energy may be coupled to the active layer via a capacitive connection.

Figure 6:
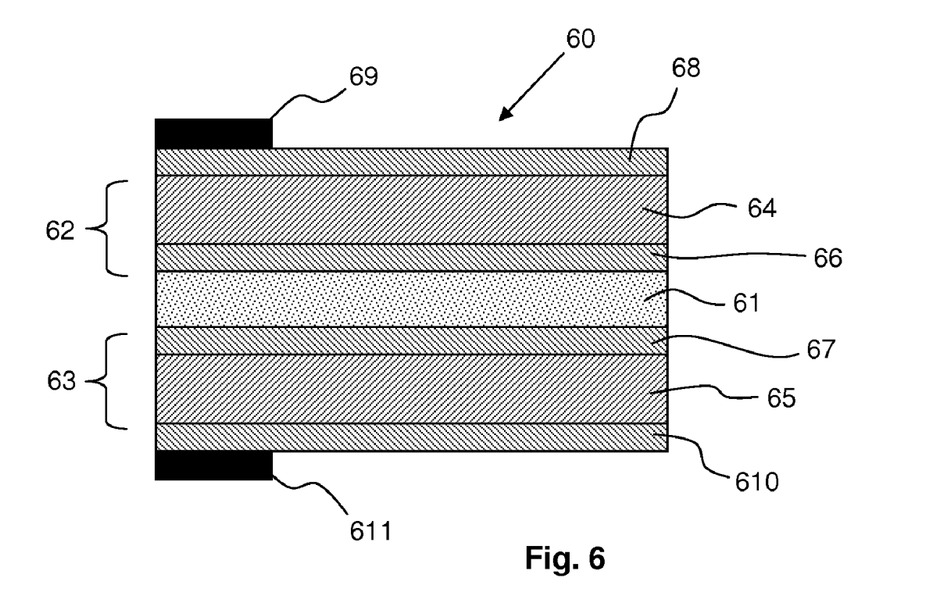
FIG. 6 is a schematic cross-section of an SPD film assembly having remote electrical connections in accordance with a fourth embodiment of the present invention.

FIG. 6 is a schematic cross-section of another SPD film assembly having remote electrical connections. The SPD film assembly 60 comprises an active layer 61, (containing the suspended particle emulsion), laminated between first 62 and second 63 planar electrode layers. Each planar electrode layer 62, 63 comprises a PET substrate 64, 65 having an electrically conductive ITO coating 66, 67 disposed thereon. The film assembly is structured such that each ITO coating 66, 67 is in contact with the active layer 61, although there may be one or more overcoat layers in between each ITO coating 66, 67 and the active layer 61.

The first planar electrode layer 62 is also provided with an additional electrically conductive coating 68 on the opposite surface to its ITO coating 66 in contact with the active layer 61. This additional electrically conductive coating 68 covers at least a portion of the surface of the PET substrate 64. A first remote electrical connector region 69 is positioned on this additional electrically conductive coating 68.

The second planar electrode layer 63 is also provided with an additional electrically conductive coating 610 on the opposite surface to its ITO coating 67 in contact with the active layer 61. This additional electrically conductive coating 610 covers at least a portion of the surface of the PET substrate 65. A second remote electrical connector region 611 is positioned on this additional electrically conductive coating 610. The first and second remote electrical connector regions 69, 611 are formed from tinned copper strips, attached to the surface of the ITO coatings 68, 610 by means of electrically conductive silver paint and electrically conductive tape.

The remote electrical connector regions 69, 611 are positioned to provide an electric field that is projected through the PET substrates 64, 65 and through the active layer 61, thereby providing a means of varying the optical transmission of the active layer. Each remote electrical connector region is remote from ITO coatings 66, 67 and the active layer 61.

In this example both remote electrical connector regions do not provide a direct galvanic contact to the ITO coatings of the planar electrode layers. Consequently, the remote electrical connector regions and the planar electrode layers couple energy via a remote electrical connection.

Figure 7:
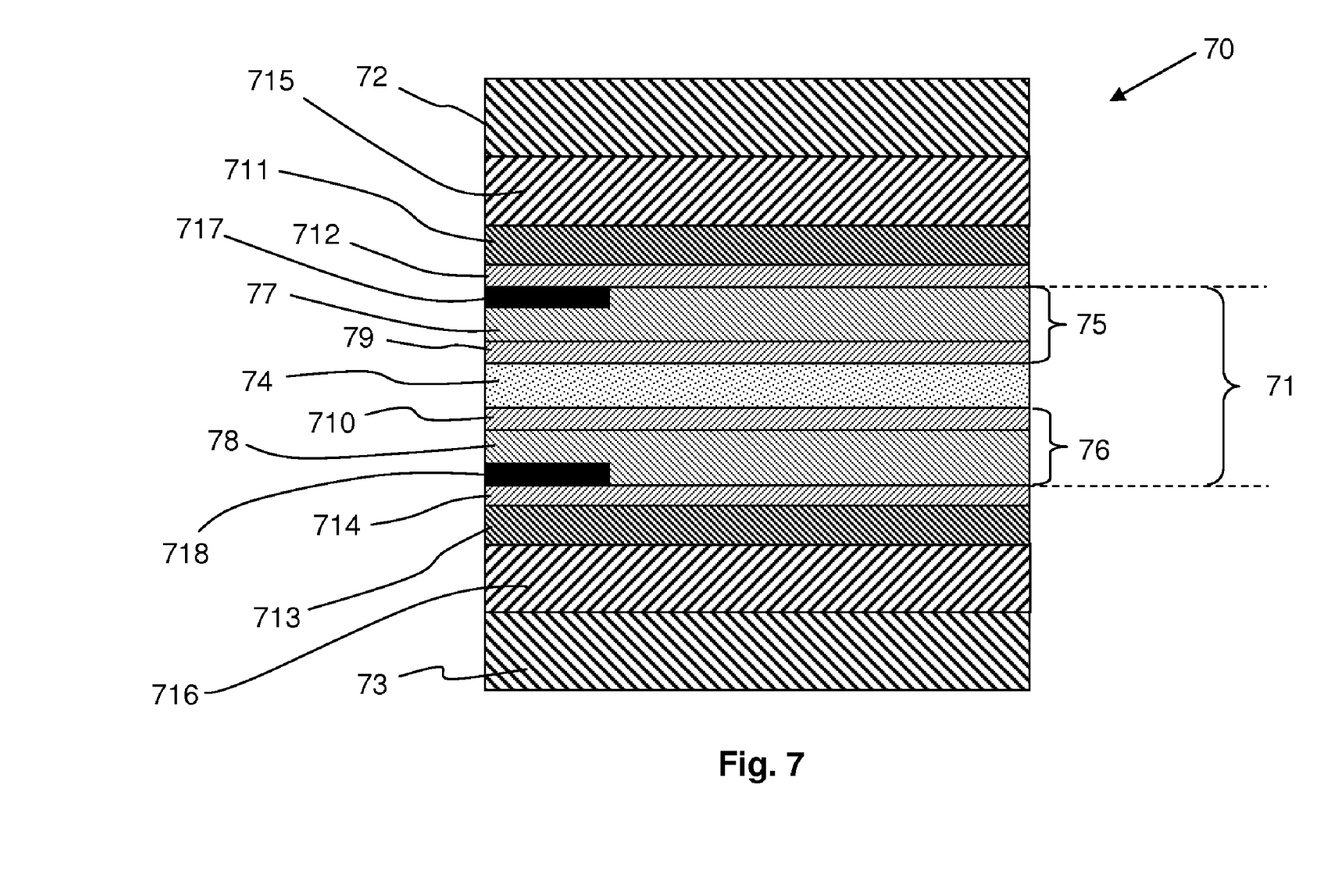
FIG. 7 is a schematic cross-section of a laminated glazing comprising an SPD film assembly having remote electrical connections in accordance with a fifth embodiment of the present invention.

FIG. 7 is a schematic cross-section of an SPD film assembly having remote electrical busbar connections in accordance with another embodiment of the present invention. A laminated glazing 70 comprises an SPD film assembly 71 laminated between two plies of silicate float glass 72, 73. The SPD film assembly 71 comprises an active layer 74 (containing the SPD material) laminated between first 75 and second 76 planar electrode layers. Each planar electrode layer 75, 76 comprises a PET substrate 77, 78 having an electrically conductive ITO coating 79, 710 disposed on one surface thereof. The film assembly is structured such that each ITO coating 79, 710 is in contact with the active layer 74, although there may be an overcoat layer in between each ITO coating 79, 710 and the active layer 74.

A first ply of an interlayer material 711 having an electrically conductive coating 712 (such as ITO) extending across at least a portion of one surface is placed in contact with the PET substrate 77 of the first planar electrode layer 75. A second ply of an interlayer material 713, having an electrically conductive coating 714 (such as ITO) extending across at least a portion of one surface, is placed in contact with the PET substrate 78 of the first planar electrode layer 76. The non-coated surface of each ply of interlayer material 711, 713 is in contact with a ply of an adhesive interlayer material 715, 716 (such as polyvinyl butyral) and is used to adhere the film assembly to the plies of silicate float glass 72, 73.

A first remote electrical connector region 717 is provided on the electrically conductive coating 712 of the first ply of interlayer material 711, in contact with the PET substrate 77 of the first planar electrode layer 75. A second remote electrical connector region 718 is provided on the electrically conductive coating 714 of the second ply of interlayer material 713, in contact with the PET substrate 78 of the second planar electrode layer 76. Again, the first and second remote electrical connector regions 717, 718 are formed from tinned copper strips, attached to the surface of the electrically conductive coatings 712, 714 by means of electrically conductive silver paint and electrically conductive tape. Preferably the plies of coated interlayer material comprise a PET substrate having an electrically conductive infra-red reflective coating on one surface.

The remote electrical connector regions 717, 718 are positioned to provide an electric field that is projected through the PET substrates 77, 78, and through the active layer 74. Each remote electrical connector region 717, 718 is remote from the ITO coating 79, 710 and the active layer 74. In this example both remote electrical connector regions do not provide a direct galvanic contact to the ITO coatings 79, 710 of the planar electrode layers 75, 76. Consequently, the remote electrical connector regions and the planar electrode layers couple energy via a capacitive connection.

Figure 8:
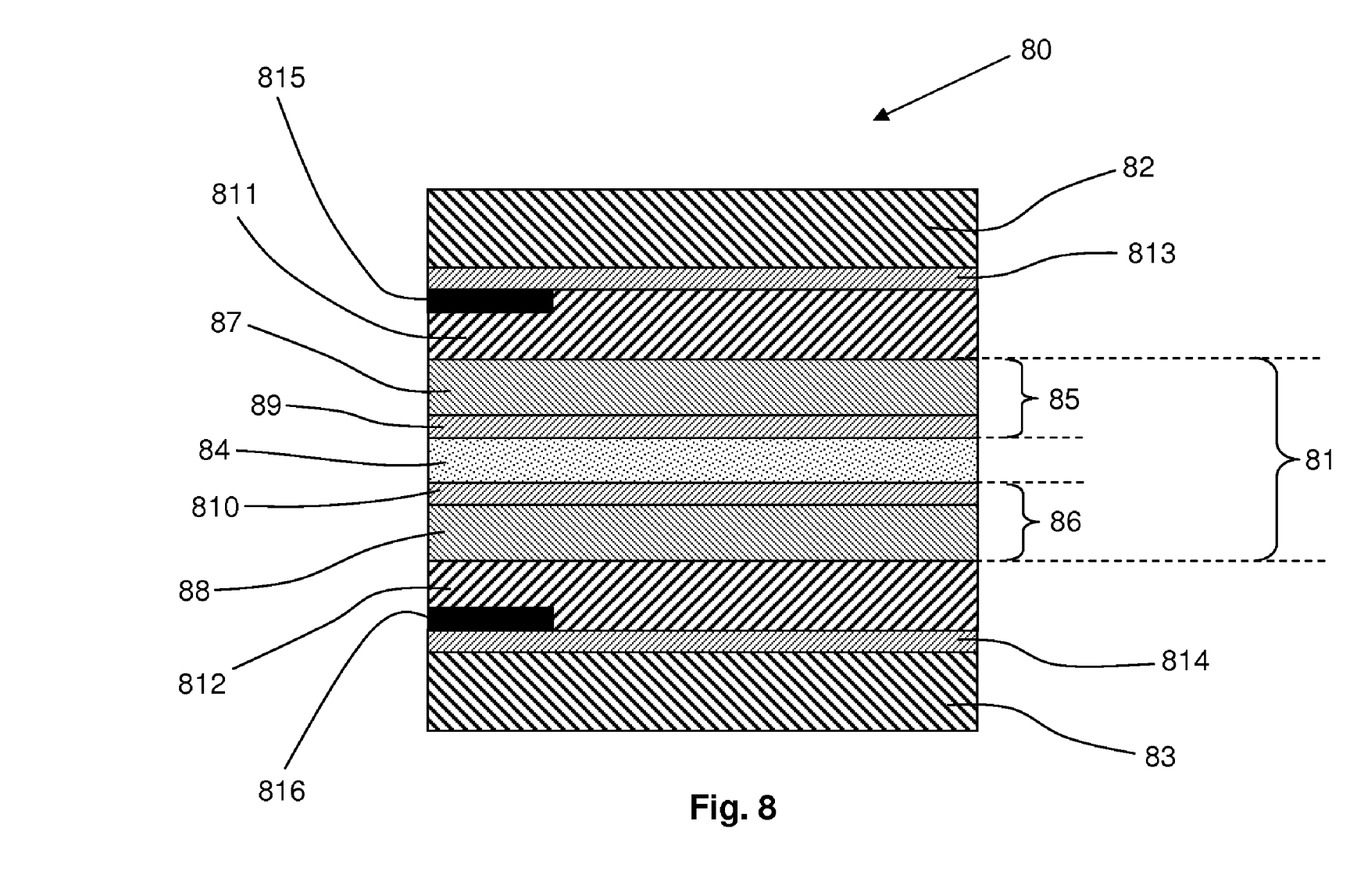
FIG. 8 is a schematic cross-section of a laminated glazing comprising an SPD film assembly having remote electrical connections in accordance with a sixth embodiment of the present invention.

FIG. 8 is a schematic cross-section of an SPD film assembly having remote electrical busbar connections in accordance with another embodiment of the present invention. A laminated glazing 80 comprises an SPD film assembly 81 laminated between two plies of silicate float glass 82, 83. The SPD film assembly 81 comprises an active layer 84 (containing the SPD material) laminated between first 85 and second 86 planar electrode layers. Each planar electrode layer 85, 86 comprises a PET substrate 87, 88 having an electrically conductive ITO coating 89, 810 disposed on one surface thereof. The SPD film assembly 81 is adhered to the plies of silicate float glass 82, 83 by two plies of an adhesive interlayer material 811, 812, such as polyvinyl butyral. Each ply of silicate float glass 82, 83 is provided with an electrically conductive coating 813, 814 extending across at least a portion of the interior surface of the ply, such that each electrically conductive coating 813, 814 is in contact with the layer of an adhesive interlayer material 811, 812. Suitable coatings 813, 814 include low emissivity coatings and solar control coatings. A low emissivity coating is a coating which when applied to clear, 3 mm thick float glass, results in the coated glass having an emissivity in the range of 0.05 to 0.45, the actual value being measured in accordance with EN 12898 (a published standard of the European Association of Flat Glass Manufacturers). The coating may be provided either online or offline, with each production route offering different emissivities. A hard (or pyrolytic) low emissivity coating may comprise a single layer of a metal oxide, preferably a transparent, electrically conductive oxide. Oxides of metals such as tin, zinc, indium, tungsten and molybdenum may be present in the metal oxide layer. Typically, the coating comprises a further dopant, such as fluorine, chlorine, antimony, tin, aluminium, tantalum, niobium, indium or gallium, for example, fluorine-doped tin oxide or tin-doped indium oxide may be used. Such coatings are generally provided with an underlayer, such as silicon or silicon oxynitride. The underlayer acts as a barrier to control migration of alkali metal ions from the glass and/or to suppress iridescent reflection colours caused by variations in thickness of the low emissivity layer.

Typical solar control coatings comprise layers of silver or tin oxide, and control the amount of heat absorbed through the coated glass. Heat reflective coatings, which have an element of solar control, for example, a two-layer silver coating, may also be used. Typically, the solar heat reflected by such coatings is greater than 23%, measured in accordance with ISO9050:E(2003), air mass 1.5. Metallic heat reflective coatings may also be electrically conductive.

A first remote electrical connector region 815 is provided on the electrically conductive coating 813 provided on the first ply of silicate float glass 82, and a second remote electrical connector region 816 is provided on the electrically conductive coating 814 of the second ply of silicate float glass 83. The first and second remote electrical connector regions 815, 816 are formed from tinned copper strips, attached to the surface of the electrically conductive coatings 813, 814 by means of electrically conductive silver paint and electrically conductive tape.

In order to determine whether a remote electrical connection would be able to transfer enough power between a power supply and a planar electrode within an SPD film to enable the switching of the film, a test sample was fabricated in accordance with the embodiment of the present invention as shown in FIG. 4. A 150V AC source, operating at 1 kHz was wired up to a busbar connected to remote electrical connector region 48 and direct electrical connector region 491. When the power supply was turned on, the optical transmission of the SPD film increased, indicating that sufficient power to drive the switching process could be transferred. In addition, 300 mm×300 mm square samples including the SPD film assembly shown in FIG. 4 were laminated between two plies of 2.1 mm thick clear glass, using 0.38 mm thick polyvinyl butyral interlayers. When connected to a power supply of the type mentioned above, the optical transmission of the laminated SPD film increased.

The switchable film is not limited to any particular switchable film design, construction or materials. For example, the planar electrode layers may comprise materials other than PET and ITO. Such electrically conductive coatings may be provided on the outer surfaces of the substrates of the planar electrode layers by printing, sputtering, self-adhesive materials or other coating methods.

Typically, a glazing comprising a switchable film assembly having a remote electrical connection in accordance with the present invention may be used as a vehicle window such as a rooflight, backlight, sidelight, or as a privacy window fitted into the interior of the vehicle. However, the switchable film assembly may be included within a windscreen to replace a sunshade or sun visor. In any of these situations, preferably the glazing material is a ply of silicate float glass having a thickness in the range of 1.2 to 3.0 mm, giving an overall glazing thickness in the range of 3.0 mm to 8.0 mm. Alternatively, the glazing material may be a plastics material, such as polycarbonate. Although the adhesive interlayer films described above are preferably polyvinyl butyral, other suitable interlayer materials such as EVA (a co-polymer of ethylene vinyl acetate), ionomer and ionoplast materials may be used instead. Preferably the layer of adhesive interlayer material used has a thickness in the range of 0.3 to 0.8 mm.

In each of the embodiments described above, the remote electrical connector region is formed from a tinned copper strip adhered to a PET substrate surface or an electrically conductive coating using electrically conductive silver paint and electrically conductive adhesive tape. However, alternative remote electrical connector regions include thin electrically conductive films and printed regions of electrically conductive ink. It is also possible to use an adhesive interlayer material (such as polyvinyl butyral) having an array of fine wires embedded therein. The array may comprise a plurality of generally parallel wires or a specific wire arrangement in one area, such as a meander pattern positioned underneath an obscuration band. Such an array of wires may be part of a heater array used to demist the glazing, or may be part of an antenna. For small regions of switchable film, electrical contacts may be adhered to the exterior of the laminated glazing containing the switchable film. As the amount of power transferred is proportional to the area of the remote electrical connector region, the voltage applied to the switchable film must be altered according to the area of the planar electrode layer of the film covered by the remote electrical connector region. For example, a remote electrical connector region having a smaller area than the planar electrode layer of the switchable film will require a higher voltage than a remote electrical connector region having the same area as the planar electrode layer.

The electrically conductive coatings of the planar electrode layers need not extend across the entirety of the PET substrate, but may be terminated away from the edge of the PET substrate. This leaves a coating-free edge region around the periphery of the switchable film which does not switch. Such a design is particularly useful for laminated glazings having exposed edges and requiring a seal that is flush with the edges of the plies of glazing material in the laminate, such as a dropping sidelight.

The invention claimed is:

1. A switchable film assembly comprising an active layer, preferably a layer of a suspended particle emulsion, between first and second electrically conductive layers, the active layer having an optical transmission that is changeable upon projecting an electric field through the active layer, the film assembly having electrical connection means to connect the film assembly to a power supply, wherein at least one of the electrical connection means comprises a first remote electrical connector region lacking direct electrical contact with the first and second electrically conductive layers, such that upon connecting the film assembly to the power supply, the first remote electrical connector region capacitively couples to the first electrically conductive layer so that an electrical field may be projected through at least a portion of the switchable film assembly thereby changing the optical transmission of the active layer.

2. A glazing pane comprising a first ply of a glazing material, preferably glass, and a switchable film assembly according to claim 1, wherein the switchable film assembly faces the first ply of glazing material.

3. Glazing pane according to claim 2, further comprising at least one other ply of glazing material, preferably glass, wherein there is an air gap between the first and the at least one other ply of glazing material.

4. Glazing pane according to claim 2, comprising at least one layer of an interlayer material having an electrically conductive coating disposed on at least a portion of one surface thereof, and wherein the first remote electrical connector region is provided on a non-coated surface of the interlayer material or on the electrically conductive coating of the interlayer material.

5. Glazing pane according to claim 2, wherein the first ply of glazing material comprises an electrically conductive coating disposed on at least a portion of a surface thereof, and wherein the first remote electrical connector region is provided on the electrically conductive coating of the first ply of glazing or on a non-coated surface of the first ply of glazing material.

6. Glazing pane according to claim 2, wherein the first remote electrical connector region is also in electrical communication with a heater array or film, an antenna or other electrical device.

7. Glazing pane according to claim 2, wherein the first remote electrical connector region comprises a busbar, preferably a tinned copper strip, or an electrically conductive coating.

8. A glazing pane according to claim 2, for use as a window in an air, land or sea vehicle, or for use as an interior window or exterior window of a building.

9. Glazing plane according to claim 2, further comprising a second ply of glazing material, preferably glass, wherein the switchable film assembly is laminated between the first and second plies of the glazing material by means of at least first and second layers of adhesive interlayer material, preferably PVB or EVA.

10. Glazing pane according to claim 9, wherein the first ply of glazing material comprises an electrically conductive coating disposed on at least a portion of a surface thereof, and wherein the first remote electrical connector region is provided on the electrically conductive coating of the first ply of glazing or on a non-coated surface of the first ply of glazing material and wherein the second ply of glazing material comprises an electrically conductive coating disposed on at least a portion of a surface thereof, and wherein the at least one other remote electrical connector region is provided on the electrically conductive coating of the second ply of glazing material or on a non-coated surface of the second ply of glazing material.

11. Glazing pane according to claim 2, further comprising at least one other remote electrical connector region, remote to the first and second electrically conductive layers.

12. Glazing pane according to claim 11, further comprising at least one layer of an interlayer material having an electrically conductive coating disposed on at least a portion of one surface thereof, and wherein the at least one other remote electrical connector region is provided on a non-coated surface of the interlayer material or on the electrically conductive coating of the interlayer material.

13. Switchable film assembly according to claim 1, wherein the first electrically conductive layer is supported on a first plastic substrate, and wherein the first remote electrical connector region is provided on the first plastic substrate.

14. Switchable film assembly according to claim 13, wherein the second electrically conductive layer is supported on a second plastic substrate, and wherein there is a second remote electrical connector region provided on the second plastic substrate.

15. A method of manufacturing a switchable film assembly having a remote electrical connector region, the method comprising:
  providing a switchable film comprising first and second planar electrode layers, each of the first and second planar electrode layers having a plastic substrate material having a first electrically conductive coating disposed on at least a portion of one surface of the plastic substrate and having an active portion laminated between the first and second planar electrode layers, the first electrically conductive coating of each of the first and second planar electrodes being in contact with the active portion; and
  depositing a second electrically conductive coating on an uncoated surface of the plastic substrate of at least one of the first and second planar electrode layers, thereby producing the remote electrical connector region which does not directly electrically contact the first electrically conductive coating of either of the first and second planar electrodes.

16. A method according to claim 15, comprising the step of making an electrical connection between the second electrically conductive coating and an electrical connection means to connect the switchable film assembly to a power supply.

17. A switchable film assembly comprising an active layer, the optical transmission of which changes with an applied voltage, laminated between first and second planar electrode layers, the first and second planar electrode layers each comprising a plastic substrate material having an electrically conductive coating disposed on at least a portion of one surface of the plastic substrate material, wherein the electrically conductive coating of the first planar electrode is in between the active layer and the plastic substrate material of the first planar electrode, and the plastic substrate of the second planar electrode is in between the active layer and the electrically conductive coating of the second planar electrode, such that the switchable film assembly has an electrically insulating region on an uncoated surface of the first planar electrode where a remote electrical connector region is positionable so that the remote electrical connector region does not directly electrically contact the electrically conductive coating of either of the first and second planar electrodes.

18. A method of manufacturing a switchable film assembly as claimed in claim 17, comprising:
  providing a first planar electrode comprising a ply of plastics material having an electrically conductive coating disposed on at least a portion of one surface thereof;
  applying a layer of a suspended particle emulsion to the electrically conductive coating on first planar electrode, forming an active layer;
  laying a second planar electrode comprising a ply of plastics material having an electrically conductive coating disposed on at least a portion of one surface thereof on to the active layer, with the ply of plastics material in contact with the active layer; and
  laminating the first planar electrode, the active layer and the second planar electrode to form the switchable film assembly.

* * * * *